United States Patent [19]

Bynum

[11] Patent Number: 4,496,003
[45] Date of Patent: Jan. 29, 1985

[54] ROCK GATHERING APPARATUS

[76] Inventor: Colonel N. Bynum, Box 455, Choteau, Mont. 59422

[21] Appl. No.: 455,406

[22] Filed: Jan. 3, 1983

[51] Int. Cl.³ .............................................. A01B 43/00
[52] U.S. Cl. ......................................... 171/63; 56/377
[58] Field of Search ...................... 171/63, 65; 56/377, 56/328 R

[56] References Cited

U.S. PATENT DOCUMENTS

| 2,683,345 | 7/1954 | Meyer | 56/377 |
| 2,755,612 | 7/1956 | Johnson | 171/65 |
| 2,816,614 | 12/1957 | Hier | 171/63 |
| 3,261,408 | 7/1966 | Simonar et al. | 171/63 |
| 4,206,812 | 6/1980 | Viel | 171/63 |

FOREIGN PATENT DOCUMENTS 1059772  8/1979  Canada .................. 171/63

Primary Examiner—Jay N. Eskovitz
Attorney, Agent, or Firm—Arthur L. Urban

[57] ABSTRACT

Rock gathering apparatus including a frame portion, a rock advancing portion and a drive portion; the frame portion including a wheeled carriage section, a hitch member extending from the wheeled carriage section; the rock advancing portion including a pair of pivotable wing sections extending outwardly from the frame portion in opposite directions, a wheeled carriage disposed adjacent the outer end of each wing section, the wing sections being normally disposed with the outer ends thereof forward of the adjacent inner ends thereof, each of the wing sections including a rake section, each of the rake sections including a central horizontal axle, a plurality of spaced finger members extending radially from the central axle, the finger members being arranged in a continuous spiral pattern; mechanism for adjusting the position of the rake sections with respect to the ground; the drive portion including mechanism for rotating the central axles, the drive mechanism including an arrangement of gears disposed adjacent the outer ends of the wing sections; whereby as the rock gathering apparatus is moved over a field the rocks are advanced by the rake sections toward the space between the adjacent inner ends of the wing sections and collected in a continuous windrow.

8 Claims, 4 Drawing Figures

ROCK GATHERING APPARATUS

This invention relates to a novel rock apparatus and more particularly relates to a new apparatus for gathering rocks.

Throughout history, man has collected rocks for a variety of different reasons. In the past and even today rocks are removed from fields in the clearing of land for agricultural and other purposes.

When only a small area is involved, rocks generally are collected by hand. Each rock is lifted by hand and then transferred to a suitable repository. This method of moving rocks requires a great deal of physical effort and time. Persons gathering rocks by hand have to be in good physical condition and have a substantial amount of available time to complete the task.

However, many people do not possess the physical strength and stamina to lift and move rocks by hand. Also, they may not have available time to perform the gathering. In this situation, an individual may try to hire someone else to do the work in his place. Hiring someone for such a menial task may be difficult to arrange.

In recent years, people have attempted to remove rocks from larger areas with machinery. Equipment of various types including rakes have been offered for sale with only limited acceptance. Although using machinery reduces the amount of physical labor required, there still are problems.

Most of the rakes and other equipment have limited width and thus require that many passes be made over a field. As a result, such machinery is only useful in relatively small acreage where limited productivity can be accepted. Machinery of this type, however, is impractical and unsatisfactory for large acreage since the time required to remove the rocks is prohibitive.

Another problem with some equipment is that it incorporates a small hopper in its design. As a result, the hopper must be emptied frequently which further reduces efficiency and productivity.

From the above discussion, it is clear that none of the methods and machinery proposed or used in the past provides a satisfactory solution to many of the problems encountered in gathering rocks. Thus, individuals are forced to accept expedients that are only partially satisfactory and which represent compromises rather than solutions to their problems.

The present invention provides a novel apparatus for gathering rocks. The apparatus of the invention gathers rocks rapidly and efficiently. Rocks can be gathered by a single individual without relying on physical strength or stamina. The apparatus also is especially useful for gathering large rocks which cannot be handled conveniently by previous machinery.

The rock gathering apparatus of the invention collects rocks into windows while leaving the fine material in place. Thus, raised areas do not remain after the rocks are removed from the field. In addition, the apparatus can be used successfully on uneven and rolling fields.

The rock gathering apparatus collects rocks from a wide path with each pass over a field. As a result, the number of passes is much less and the time spent in gathering rocks is substantially reduced. As a result, the productivity of the machinery and the operator are greatly increased.

The rock gathering apparatus of the invention is simple in design and relatively inexpensive to manufacture. The apparatus can be fabricated from commercially available materials and components. Conventional farm equipment fabrication methods can be employed in its manufacture.

The rock gathering apparatus can be used conveniently and efficiently by farmers and ranch hands after only a minimum of instruction. The apparatus is durable in construction and has a long useful life. The design of the apparatus minimizes downtime for maintenance.

These and other advantages and benefits of the novel rock gathering apparatus of the present invention will be apparent from the following description and the accompanying drawings in which.

Figure 1:
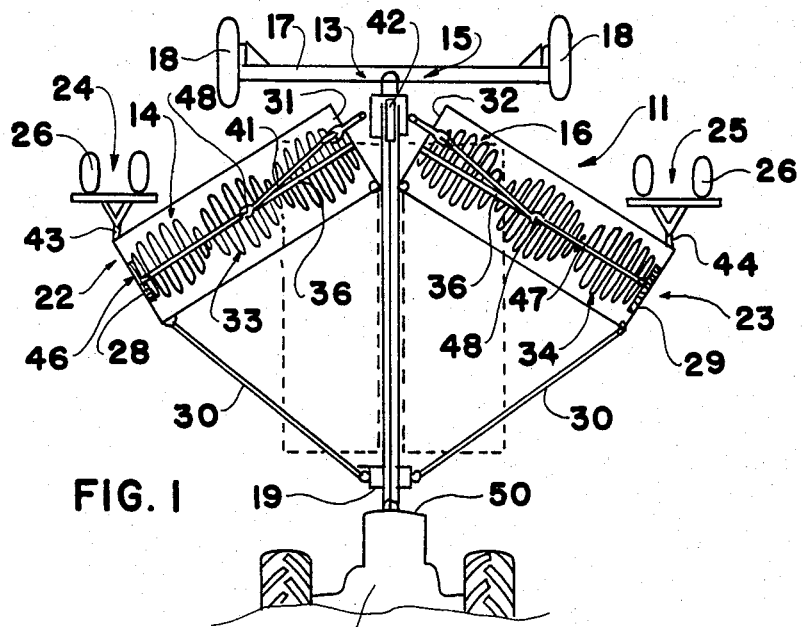
FIG. 1 is a top view of one form of the rock gathering apparatus of the invention.
Figure 2:
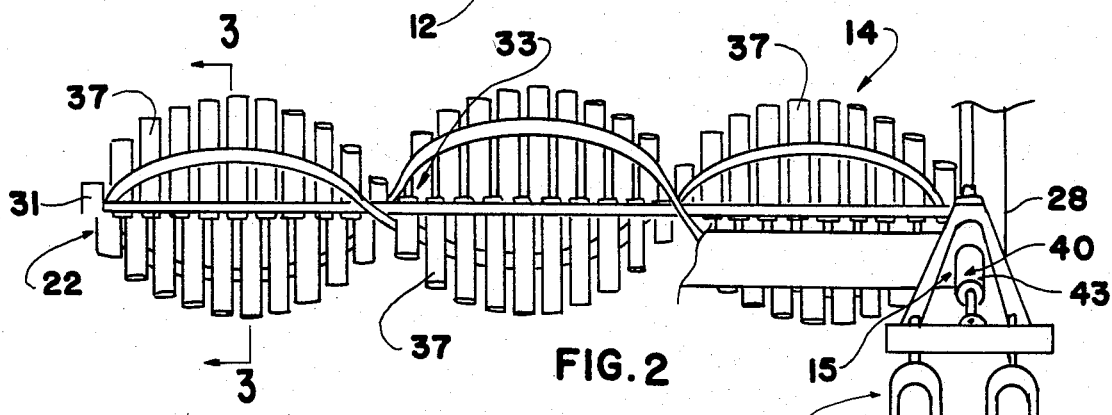
FIG. 2 is an enlarged side view of the rock advancing portion of the apparatus shown in FIG. 1.

As shown in the drawings, one form of the novel rock gathering apparatus 11 of the present invention is towed by a tractor 12. The rock gathering apparatus 11 includes a frame portion 13, a rock advancing portion 14, a control portion 15 and a drive portion 16.

The frame portion 13 of the rock gathering apparatus 11 includes a carriage section 17 with wheels 18. A hitch member 19 extends from the wheeled carriage section 17. Advantageously, the carriage section 17 and wheels 18 are pivotable with respect to the frame portion 13.

The rock advancing portion 14 of the apparatus 11 includes a pair of pivotable wing sections 22 and 23. The wing sections 22 and 23 extend outwardly from the frame portion 13 in opposite directions. The wing sections include wheeled carriage means 24 and 25 disposed adjacent the outer ends 28 and 29 thereof, preferably with castor wheels 26.

The wing sections 22 and 23 normally are disposed with the outer ends thereof 28 and 29 forward of the adjacent inner ends 31 and 32 of the wing sections. Thus, as shown in FIG. 1, the outer ends 28 and 29 of the wing sections are closer to the towing vehicle (tractor 12) than the inner ends 31 and 32. The inner ends of the wing sections advantageously are spaced from one another.

The wing sections 22 and 23 preferably are pivotable from their normal opposed positions to positions substantially parallel to the hitch member 19 as shown by dotted lines in FIG. 1. Advantageously, connector bars 30 join the outer ends of the wing sections 22 and 23 with the hitch member 19. The combination of the connector bars 30 and the wheeled carriages 24 and 25 provide structural integrity for the outer ends 28 and 29 of the wing sections 22 and 23.

Each of the wing sections 22 and 23 includes a rake section 33 or 34. Each rake section 33 or 34 includes a central axle 36. The axles 36 are disposed in a generally horizontal orientation.

The rake sections 33 and 34 include a plurality of spaced finger members 37. The finger members 37 extend radially from the central axle 36. The finger members 37 are arranged in a compounded spiral pattern as shown with the fingers disposed adjacent each other along the central axle 36. Thus, the fingers form a stepped configuration.

The finger/axle assembly provides an auger with transverse spacing along its length. The finger sections 37 advantageously have a cross sectional thickness greater than the width thereof. The finger sections preferably include a wear surface 38 as the leading edge thereof. The wear surface 38 may be a hardened part of each finger member 37 or may be a separable section which can be replaced when worn.

Figures 3, 4:
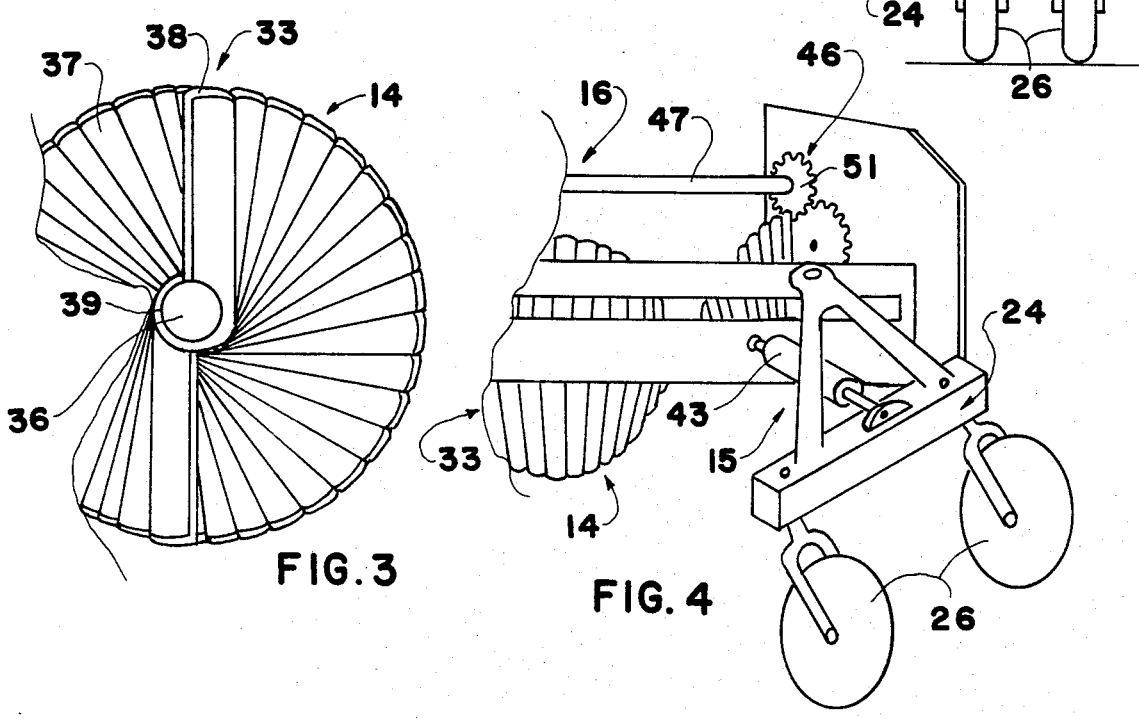
FIG. 3 is a sectional view of the rock advancing portion of the apparatus shown in FIG. 2 taken along line 3—3 thereof.
FIG. 4 is a fragmentary view in perspective of part of the rock advancing portion shown in FIGS. 1 and 2.

The finger sections 37 advantageously are affixed to the central axle 36 through an arcuate cutout 39 in the finger section adjacent the axle. This construction is shown in FIG. 3 of the drawings.

The control portion 15 of the rock gathering apparatus 11 includes means 40 for adjusting the position of the rake sections 33 and 34 with respect to the ground. Preferably, such control means 40 includes hydraulic cylinders 42, 43 and 44. Cylinder 42 may be mounted on the frame portion 13 to control the spacing of the wheels 18 with respect to frame portion 13. Likewise, cylinders 43 and 44 associated with carriages 24 and 25 control the spacing between the wing sections 22 and 23 respectively and the castor wheels 26 of the carriages. In this way, the hydraulic cylinders 42-44 control the clearance of the rake sections 33 and 34 from the ground.

The drive portion 16 of the rock gathering apparatus 11 includes means 46 for rotating the central axles 36. Preferably, rotation is achieved through a combination of drive shafts 47 and universal joints 48. This arrangement facilitates connection of main drive shaft 49 of the rock gathering apparatus 11 to the power takeoff 50 of a tractor 12. The utilization of universal joints permits independent movement of the individual wing sections as the apparatus 11 passes over uneven land.

The drive portion 16 further includes a gear arrangement 51 for each wing section 22 and 23. The gear combinations are disposed adjacent the outer ends 28 and 29 of the wing sections. This construction enables the drive portion 16 to be disconnected easily by separating sections of the drive shafts 47. Advantageously, the gear combination 51 includes gears that are interchangeable to provide a convenient means for changing the rotational speed of the rake sections 33 and 34.

The rock gathering apparatus 11 of the present invention may be fabricated from commercially available materials and components that normally are employed for farm machinery. Conventional farm equipment fabrication techniques and procedures may be utilized in the manufacture of the apparatus of the invention.

In the use of the rock gathering apparatus 11 shown in the drawings, the apparatus is attached to a tractor 12 or other towing vehicle through hitch member 19. In the transfer position, the wing sections 22 and 23 are folded substantially parallel to each other and to the hitch member. The rake sections 33 and 34 are in a raised position to provide clearance from the ground.

The rock gathering apparatus 11 is not towed to a field which needs to have the rocks removed therefrom. In the folded position, the apparatus can be moved along roads and pass through gates without interference.

Upon reaching the desired field, the apparatus 11 is set up for rock gathering. This is accomplished by swinging the wing sections 22 and 23 rearwardly to their opposed operating positions. Connector bars 30 are secured between the hitch member 19 and the outer ends 28 and 29 of the wing sections.

The drive shafts 47 and the universal joints 48 are interconnected and the main drive shaft 49 is affixed to power takeoff 50 of tractor 12. Hydraulic cylinders 42-44 are activated to lower the rake sections 33 and 34 of the wing sections 22 and 23 to the desired operating clearance from the ground. The apparatus 11 now is ready to gather rocks.

Tractor 12 is driven over the field towing the apparatus 11 behind it. The drive shafts 47 drive gear combinations 51 to effect rotation of the rake sections. During this rotation, the finger members 37 of the rake sections lift rocks from the ground.

Since the rake sections have a generally continuous spiral configuration, the rake sections 33 and 34 act as augers advancing the rocks too large to pass between the finger members 37 thereof toward the inner ends 31 and 32 of the wing sections. The small material drops between the finger members 37 and is uniformly distributed over the ground.

The rocks collected on the rake sections 33 and 34 move off the inner ends thereof and are deposited in the space between the inner ends 31 and 32 of the wing sections in a continuous windrow. The collected rocks can be removed from the field easily with loading equipment including conveyors, scoops and the like.

The above description and the accompanying drawings show that the present invention provides a novel apparatus for gathering rocks rapidly and efficiently. Rocks can be gathered by a single individual using the apparatus of the invention without relying on physical strength and stamina. Rocks larger than can be handled by previous machinery may be gathered easily with the apparatus of the invention.

The rock gathering apparatus of the present invention collects rocks into windrows while leaving fine materials evenly distributed over the field. The apparatus covers a wide swath with each pass so the time required to clean a field is considerably reduced. This results in significant increases in efficiency and productivity.

Farm and ranch hands can operate the rock gathering apparatus of the invention efficiently after only a minimum of instruction. The apparatus is especially useful on rolling and uneven fields. The apparatus is durable in construction and thus has a long useful life. The design of the apparatus minimizes maintenance and the attendant downtime.

It will be apparent that various modifications can be made in the particular rock gathering apparatus described in detail above and shown in the drawings within the scope of the invention. The size, configuration and arrangement of components can be different to meet specific requirements. These and other changes can be made in the rock gathering apparatus of the invention provided the functioning and operation thereof are not adversely affected. Therefore, the scope of the present invention is to be limited only by the following claims.

What is claimed is:

1. Rock gathering apparatus including a frame portion, a rock advancing portion, a control portion and a drive portion; said frame portion including a first wheeled carriage section, an elongated hitch member extending from said first wheeled carriage section; said rock advancing portion including a pair of pivotable wing sections extending outwardly from said frame portion in opposite directions, second wheeled carriage means disposed adjacent the outer end of each wing section, said wing sections being normally disposed with the outer ends thereof forward of the adjacent inner ends thereof and pivotable forwardly to positions closely adjacent and parallel to one another and to said hitch member, each of said wing sections including a rake section, each of said rake sections including a central horizontal axle, a plurality of spaced finger members extending radially from said central axle, said finger members being arranged in continuous compounded spiral patterns with the spacing along said central axis between adjacent finger members being substantially less than the rock contacting face of each finger member, said finger members being affixed to said central axis through an extended length arcuate cutout in each finger member adjacent said axis; said control portion including hydraulic cylinder means operatively connected to said first and second wheeled carriages for adjusting the position of said rake sections with respect to the ground; said drive portion including means for rotating said central axles, said drive portion including separable shaft means and universal joints therebetween connectable to a power takeoff, said drive means including an arrangement of gears disposed adjacent the outer ends of said wing sections, said gear arrangements including interchangeable gears for changing the rotational rate of said rake sections; whereby as said rock gathering apparatus is moved over a field said rocks are advanced by said rake sections toward the space between the adjacent inner ends of said wing sections and collected in a continuous windrow.

2. Rock gathering apparatus according to claim 1 wherein the inner ends of said wing sections are spaced from one another.

3. Rock gathering apparatus according to claim 1 including connecting means joining said hitch member and the outer end of each of said wing sections.

4. Rock gathering apparatus according to claim 1 wherein said finger members have a cross section with a thickness greater than the width thereof.

5. Rock gathering apparatus according to claim 1 wherein said finger members include wear surfaces.

6. Rock gathering apparatus according to claim 5 wherein said wear surfaces are separable from said finger members.

7. Rock gathering apparatus according to claim 1 wherein said control portion includes hydraulic cylinders.

8. Rock gathering apparatus according to claim 7 wherein a cylinder is included with each of said wheeled carriage means of said wing sections and said frame portion.

* * * * *